(12) United States Patent
Shovkoplias

(10) Patent No.: US 10,667,015 B2
(45) Date of Patent: May 26, 2020

(54) VIDEO SERVICES RECEIVER THAT PROVIDES A SERVICE-SPECIFIC LISTING OF RECORDED CONTENT, AND RELATED OPERATING METHODS

(75) Inventor: Yuri Shovkoplias, Kharkov (UA)

(73) Assignee: ECHOSTAR UKRAINE, L.L.C., Kharkov (UA)

( * ) Notice: Subject to any disclaimer, the term of this patent is extended or adjusted under 35 U.S.C. 154(b) by 518 days.

(21) Appl. No.: 13/988,320

(22) PCT Filed: Oct. 27, 2010

(86) PCT No.: PCT/UA2010/000080
§ 371 (c)(1),
(2), (4) Date: Feb. 25, 2014

(87) PCT Pub. No.: WO2012/057719
PCT Pub. Date: May 3, 2012

(65) Prior Publication Data
US 2015/0304728 A1 Oct. 22, 2015

(51) Int. Cl.
*H04N 21/482* (2011.01)
*G06F 16/955* (2019.01)
(Continued)

(52) U.S. Cl.
CPC ..... *H04N 21/4828* (2013.01); *G06F 16/7867* (2019.01); *G06F 16/955* (2019.01);
(Continued)

(58) Field of Classification Search
CPC ........... H04N 21/4828; H04N 21/4147; H04N 21/4316; H04N 21/84
See application file for complete search history.

(56) References Cited

U.S. PATENT DOCUMENTS

2002/0170057 A1* 11/2002 Barrett ............... H04N 5/44543
725/41
2003/0226146 A1* 12/2003 Thurston ............ H04N 5/44543
725/46
(Continued)

FOREIGN PATENT DOCUMENTS

WO 2008030565 A2 3/2008

OTHER PUBLICATIONS

European Patent Office, International Search Report and Written Opinion, dated May 24, 2011 for International Appln. No. PCT/UA2010/000080.
(Continued)

*Primary Examiner* — Joshua D Taylor
(74) *Attorney, Agent, or Firm* — Lorenz & Kopf LLP

(57) ABSTRACT

A method of operating a video services receiver is provided. The video services receiver can record program content and present recorded program content to a user. The method provides first program content to a presentation device, and obtains a request for program content recorded from the particular programming service (channel) that is providing the first program content. In response to the request, the method searches for recorded program content associated with the particular programming service, and then controls a display of search results obtained from the searching. The display is rendered as an interactive channel-specific listing of recorded content.

10 Claims, 7 Drawing Sheets

(51) Int. Cl.
*G06F 16/78* (2019.01)
*H04N 21/4147* (2011.01)
*H04N 5/445* (2011.01)
*H04N 21/432* (2011.01)
*H04N 21/433* (2011.01)
*H04N 21/472* (2011.01)
*H04N 21/84* (2011.01)
*H04N 21/431* (2011.01)
*H04N 21/488* (2011.01)

(52) U.S. Cl.
CPC ..... *H04N 5/44543* (2013.01); *H04N 21/4147* (2013.01); *H04N 21/432* (2013.01); *H04N 21/4316* (2013.01); *H04N 21/4325* (2013.01); *H04N 21/4334* (2013.01); *H04N 21/47214* (2013.01); *H04N 21/47217* (2013.01); *H04N 21/482* (2013.01); *H04N 21/84* (2013.01); *H04N 21/4886* (2013.01)

(56) References Cited

U.S. PATENT DOCUMENTS

| | | | |
|---|---|---|---|
| 2004/0221308 A1* | 11/2004 | Cuttner | H04N 5/44543 725/46 |
| 2006/0017980 A1* | 1/2006 | Yatabe | G11B 27/034 358/296 |
| 2009/0195696 A1* | 8/2009 | McDaniel | H04N 5/44543 348/570 |
| 2009/0249086 A1* | 10/2009 | Reams | G08C 17/02 713/300 |

OTHER PUBLICATIONS

European Patent Office, Examination Report, dated Mar. 19, 2014 for European Patent Application No. 10 812 963.6.

\* cited by examiner

VIDEO SERVICES RECEIVER THAT PROVIDES A SERVICE-SPECIFIC LISTING OF RECORDED CONTENT, AND RELATED OPERATING METHODS

CROSS-REFERENCES TO RELATED APPLICATIONS

This Application claims priority to International Application No. PCT/UA2010/000080, filed Oct. 27, 2010.

TECHNICAL FIELD

Embodiments of the subject matter described herein relate generally to graphical user interfaces, such as a listing of recorded program content for a video services system. More particularly, embodiments of the subject matter relate to the generation and presentation of an interactive channel-specific listing of recorded program content.

BACKGROUND

Most television viewers now receive their video signals through a content aggregator such as a cable or satellite television provider. Digital video broadcasting (DVB) systems, such as satellite systems, are generally known. A DVB system that delivers video service to a home will usually include a video services receiver system or device, which is commonly known as a set-top box (STB). In the typical instance, encoded television signals are sent via a cable or wireless data link to the viewer's home, where the signals are ultimately decoded in the STB. The decoded signals can then be viewed on a television or other appropriate display as desired by the viewer.

A conventional STB may include or cooperate with a digital video recorder (DVR) that is designed to record video, audio, and/or audiovisual programs received by the STB. The user can then play recorded programs at any convenient time. Accordingly, a conventional STB can generate a menu or listing of recorded programs for graphical rendering on a display device, such as a television or a monitor. The user can navigate an onscreen listing of recorded programs to identify or select a program for playback, to delete recorded content, etc. Traditionally, an onscreen listing of recorded programs will identify all of the programs recorded by the host STB regardless of the contextual content, the channel, the service provider, or the like. Consequently, it may be difficult, time consuming, and frustrating for a user to navigate through a long list of recorded programs, some of which may have been recorded by a different user.

Accordingly, it is desirable to have an improved methodology for presenting recorded content to a user of a video services receiver. Furthermore, other desirable features and characteristics will become apparent from the subsequent detailed description and the appended claims, taken in conjunction with the accompanying drawings and the foregoing technical field and background.

BRIEF SUMMARY

A method of presenting information associated with program content recorded with a video services receiver is provided here. The method determines an identifier of a programming service corresponding to a program that is currently being presented by the video services receiver, and interrogates a database of recorded program content maintained by the video services receiver. The method continues by retrieving, from the database, at least one entry that includes the identifier, while disregarding any entry in the database that does not include the identifier. Next, the method presents information that describes the at least one entry.

Also provided is a method of operating a video services receiver that records program content and presents recorded program content. The method provides first program content to a presentation device, where the first program content is associated with a particular programming service, such as a specific channel. The method continues by obtaining a request for recorded program content associated with the particular programming service, and, in response to obtaining the request, searching for recorded program content associated with the particular programming service. The method then controls a display of search results obtained from the searching.

A video services receiver for providing recorded and non-recorded content to a user is also provided. The video services receiver includes: a receiver interface to receive data associated with video services; a recording module coupled to the receiver interface to record programs provided by the video services; at least one data storage element coupled to the recording module to store recorded programs for the recording module, and to maintain a database that contains an entry for each recorded program; a display interface for a display operatively coupled to the video services receiver, the display interface facilitating presentation of programs on the display, and facilitating presentation of service-specific interactive listings of recorded programs; and a processor coupled to the receiver interface, the recording module, the at least one data storage element, and the display interface. The processor determines a service identifier of a presented program that is currently being presented by the video services receiver, filters entries in the database to find those having a recorded service identifier that matches the determined service identifier, and prepares a service-specific interactive listing that includes the filtered entries.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. Moreover, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The exemplary embodiments described below relate to a video delivery system such as a satellite television system. The disclosed subject matter relates to the generation and rendering of a list of programs that have been recorded by a video services receiver (e.g., a STB). More specifically, the disclosed subject matter relates to the generation and rendering of an interactive listing of recorded program content, wherein the listing only contains programs recorded for a particular programming service (e.g., a particular channel). In certain preferred embodiments, the listing only contains programs that have been recorded for the channel that is currently being rendered or otherwise presented by the video services receiver.

Figure 1:
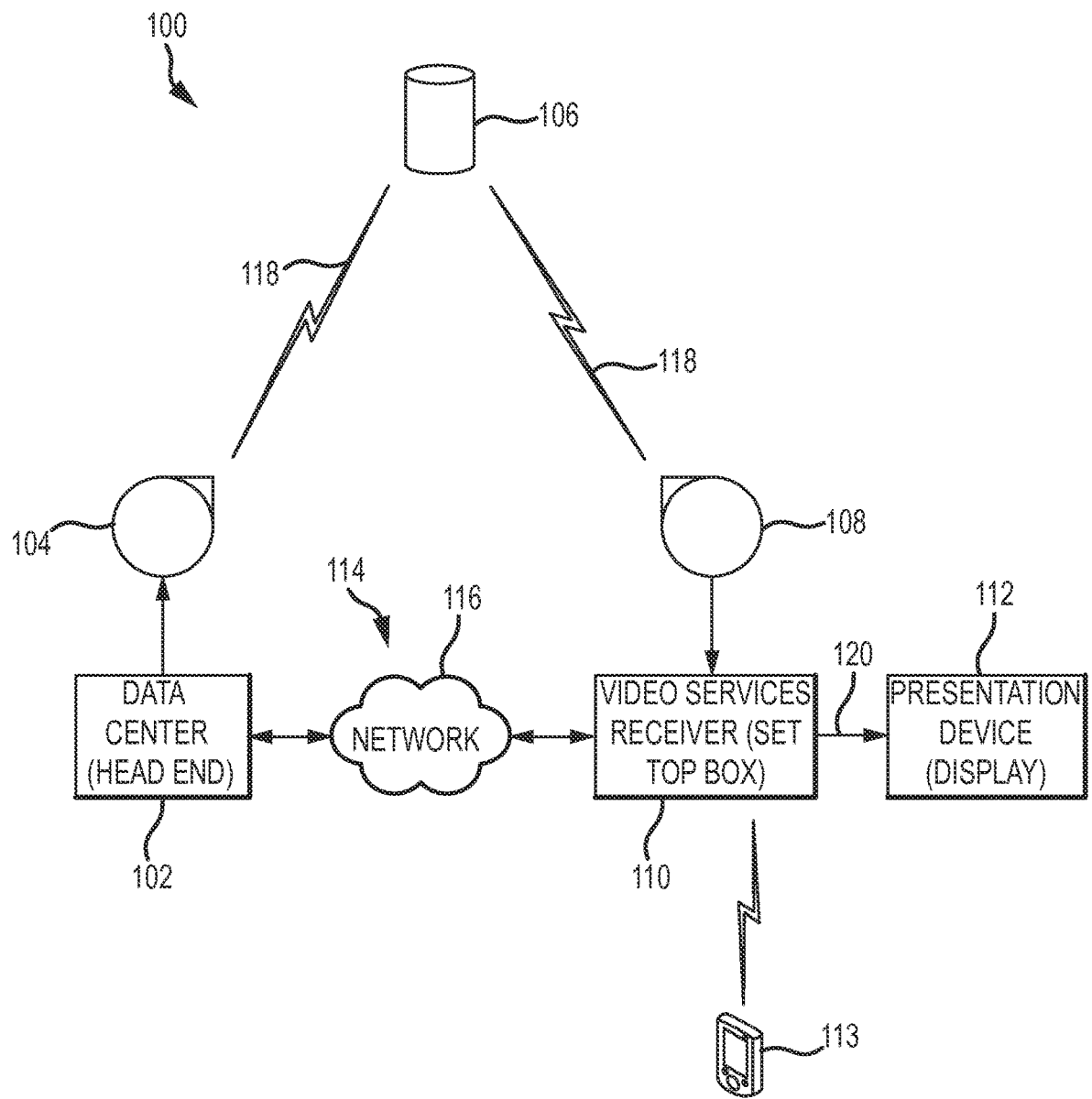
FIG. 1 is a schematic representation of an embodiment of a video services broadcasting system.

Turning now to the drawings, FIG. 1 is a schematic representation of an embodiment of a video services broadcasting system 100 that is suitably configured to support the techniques and methodologies described in more detail below. The system 100 (which has been simplified for purposes of illustration) generally includes, without limitation: a data center 102; an uplink transmit antenna 104; a satellite 106; a downlink receive antenna 108; a video services receiver 110 or other customer equipment; and a presentation device, such as a display device 112. In typical deployments, the video services receiver 110 can be remotely controlled using a wireless remote control device 113. In certain embodiments, the data center 102 communicates with the video services receiver 110 via a back-channel connection 114, which may be established through one or more data communication networks 116. For the sake of brevity, conventional techniques related to satellite communication systems, satellite broadcasting systems, DVB systems, data transmission, signaling, network control, and other functional aspects of the systems (and the individual operating components of the systems) may not be described in detail herein.

The data center 102 may be deployed as a headend facility and/or a satellite uplink facility for the system 100. The data center 102 generally functions to control content and data sent over a high-bandwidth link 118 to any number of downlink receive components (only one downlink receive antenna 108, corresponding to one customer, is shown in FIG. 1). In practice, the data center 102 also provides content and data that can be used to populate an interactive programming guide generated by the video services receiver 110 and/or to populate an interactive recorded program listing generated by the video services receiver 110. In the embodiment shown in FIG. 1, the high-bandwidth link 118 is a direct broadcast satellite (DBS) link that is relayed by the satellite 106, although equivalent embodiments could implement the high-bandwidth link 118 as any sort of cable, terrestrial wireless and/or other communication link as desired.

The data center 102 includes one or more conventional data processing systems or architectures that are capable of producing signals that are transmitted via the high-bandwidth link 118. In various embodiments, the data center 102 represents a satellite or other content distribution center having: a data control system for controlling content, signaling information, blackout information, programming information, and other data; and an uplink control system for transmitting content, signaling information, blackout information, programming information, and other data using the high-bandwidth link 118. These systems may be geographically, physically and/or logically arranged in any manner, with data control and uplink control being combined or separated as desired.

The uplink control system used by system 100 is any sort of data processing and/or control system that is able to direct the transmission of data on the high-bandwidth link 118 in any manner. In the exemplary embodiment illustrated in FIG. 1, the uplink transmit antenna 104 is able to transmit data to the satellite 106, which in turn uses an appropriate transponder for repeated transmission to the downlink receive antenna 108.

Under normal operating conditions, the satellite 106 transmits content, signaling data, blackout information, programming data, and other data to the downlink receive antenna 108, using the high-bandwidth link 118. In practical embodiments, the downlink receive antenna 108 represents the customer's satellite dish, which is coupled to the video services receiver 110. The video services receiver 110 can be realized as any device, system or logic capable of receiving signals via the high-bandwidth link 118 and the downlink receive antenna 108, and capable of providing demodulated content to a customer via the display device 112.

The display device 112 may be, without limitation: a television set; a monitor; a computer display; or any suitable customer appliance with compatible display capabilities. In various embodiments, the video services receiver 110 is a conventional set-top box commonly used with DBS or cable television distribution systems. In other embodiments, however, the functionality of the video services receiver 110 may be commonly housed within the display device 112 itself. In still other embodiments, the video services receiver 110 is a portable device that may be transportable with or without the display device 112. The video services receiver 110 may also be suitably configured to support broadcast television reception, video game playing, personal video recording and/or other features as desired.

During typical operation, the video services receiver 110 receives programming (broadcast events), signaling information, and/or other data via the high-bandwidth link 118. The video services receiver 110 then demodulates, decompresses, descrambles, and/or otherwise processes the received digital data, and then converts the received data to suitably formatted video signals 120 that can be rendered for viewing by the customer on the display device 112. For the implementation described here, the video services receiver 110 includes or cooperates with a recording module (e.g., a DVR module) that records received programming for time-shifted playback. The recorded programs may include any combination of audio programs, video programs, audiovisual programs, or the like. Additional features and functions of the video services receiver 110 are described below with reference to FIG. 3.

The system 100 includes one or more speakers, transducers, or other sound generating elements or devices that are utilized for playback of sounds during operation of the system 100. These sounds may be, without limitation: the audio portion of a video channel or program; the content associated with an audio-only channel or program; audio related to the navigation of the graphical programming guide; confirmation tones generated during operation of the system; alerts or alarm tones; or the like. Depending upon the embodiment, the system 100 may include a speaker (or a plurality of speakers) attached to, incorporated into, or otherwise associated with the display device. Alternatively or additionally, the system 100 may include a speaker (or a plurality of speakers) attached to, incorporated into, or otherwise associated with the video services receiver 110. Alternatively or additionally, the system 100 may include a speaker (or a plurality of speakers) attached to, incorporated into, or otherwise associated with the remote control device 113. Notably, one or more of the speakers might be deployed as part of a home theater, stereo, or other entertainment system provided separately from the system 100.

Figure 2:
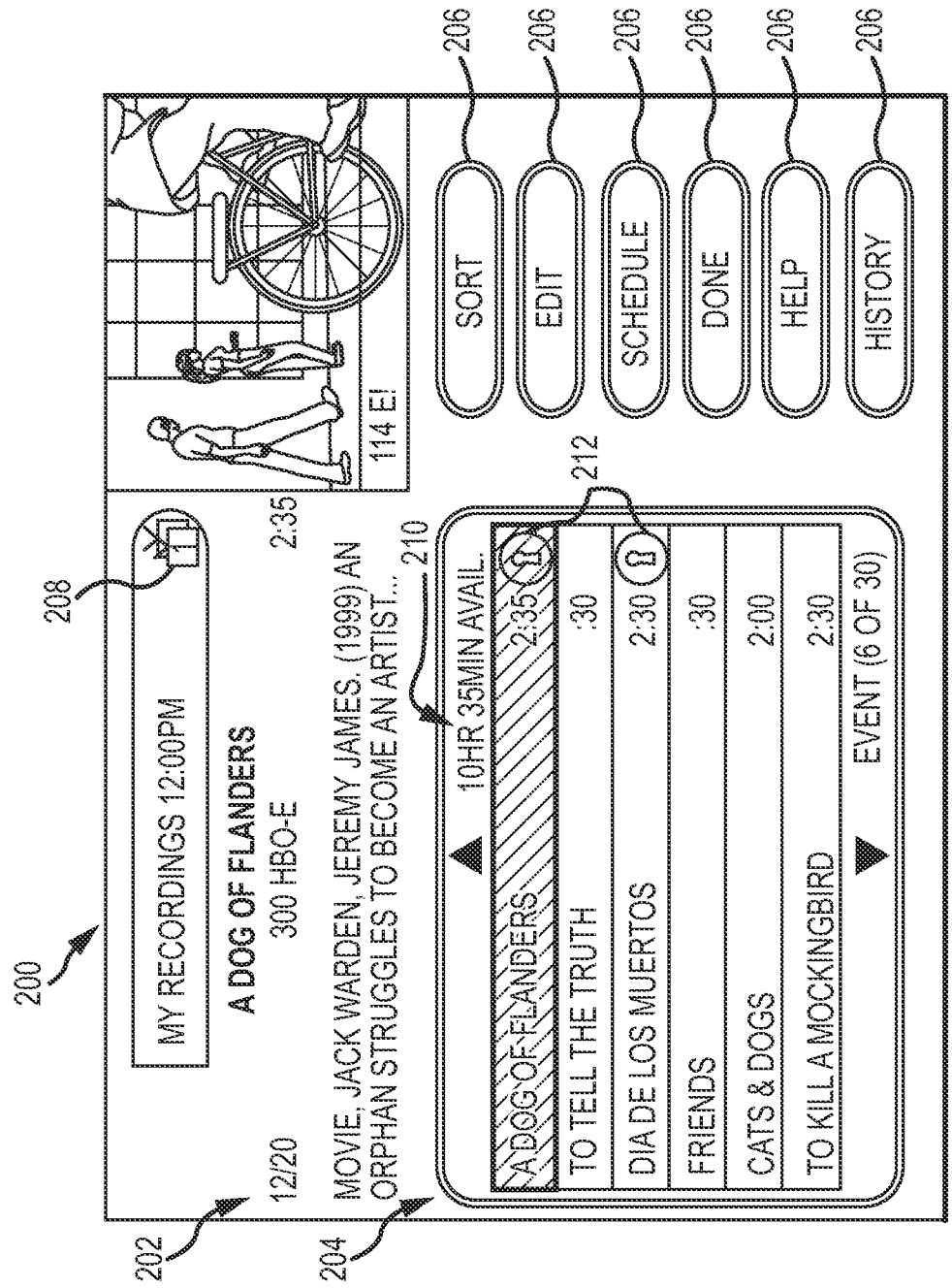
FIG. 2 is a screen illustration of a conventional listing of recorded program content.

FIG. 2 is a screen illustration of a conventional listing 200 of recorded program content, which might be provided by a traditional video services receiver (or, in certain situations, by the video services receiver 110 shown in FIG. 1). This interactive listing 200 is merely one possible menu (with user-selectable elements) that could be generated by a video services receiver. The interactive listing 200 relates to recorded content, and it includes, without limitation: a program description area 202; a recorded program list window 204; and various command buttons 206. This version of the interactive listing 200 also includes a receiver, tuner, or television identifier 208 (e.g., TV1 or TV2 for a component having dual receivers or tuners). The program description area 202 may be used to provide additional information or data for a selected recorded program. For example, the program description area 202 could be used to indicate (in text), without limitation: the designated time slot of the selected program; the title or name of the selected program; the rating (or other classification or category) of the selected program; a brief summary or abstract related to the content of the selected program; etc. In certain embodiments, the program description area 202 is a user-selectable or focusable element of the listing 200.

The recorded program list window 204 may be used to indicate content that has been recorded. In typical implementations, the recorded program list window 204 will include text to identify the recorded programs (by title, channel number, and/or other identifiers) and their respective recorded/playback times or event durations. A recorded program that has been locked will have a lock status icon 212 displayed with its listing, as shown in FIG. 2. The lock status icon 212 is removed when the program is unlocked. The illustrated version of the recorded program list window 204 also includes an indication of the time available for recording 210. Each entry in the recorded program list window 204 might be generated and rendered as a user-selectable or focusable element of the interactive listing 200. In this regard, FIG. 2 depicts the state of the interactive listing 200 at a time when the program titled "A Dog of Flanders" has been selected. Notably, the program description area 202 identifies the title of the program, its date, its recorded/playback length, and a brief description of its content.

Each of the command buttons 206 is generated and rendered as a user-selectable or focusable element of the interactive listing 200. This example includes six command buttons 206 that can be activated to perform different functions: Sort; Edit; Schedule; Done; Help; and History. Moreover, each of the command buttons 206 is rendered with a text label that indicates its function or feature. In practice, these functions are relevant to program recording, recorded content management, and the like.

Notably, the interactive listing 200 is conventional in that it includes recorded content regardless of the recorded channel, and regardless of the channel to which the video services receiver is currently tuned. For example, the interactive listing 200 depicted in FIG. 2 contains thirty entries, which may or may not all be recorded from the same channel. In contrast to this conventional type of listing, an interactive service-specific or channel-specific recorded program listing is presented in the following description.

Figure 3:
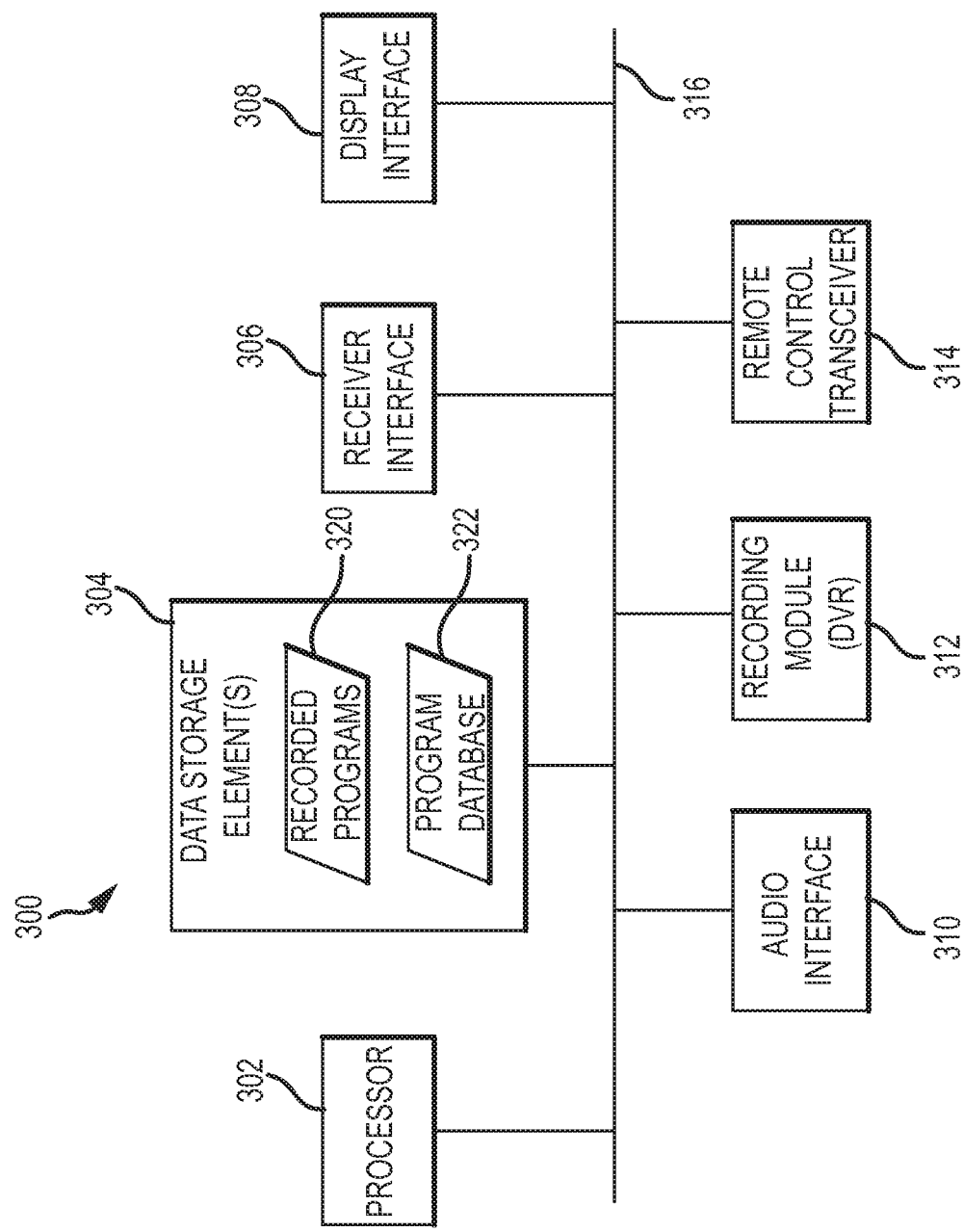
FIG. 3 is a schematic representation of an embodiment of a video services receiver suitable for use in the video services broadcasting system shown in FIG. 1.

FIG. 3 is a schematic representation of an embodiment of a video services receiver 300 suitable for use in the video services broadcasting system 100 shown in FIG. 1. The video services receiver 300 is designed and configured for providing recorded and non-recorded content to a user, by way of one or more presentation devices. Accordingly, the video services receiver 300 can be used to receive program content, record program content, and present recorded and non-recorded program content to an appropriate display for viewing by a customer or user. The video services receiver 300 also supports features that enhance the user experience while navigating and selecting recorded programs using on-screen menus, GUIs, interactive guides, and the like. These enhanced features are described in more detail below.

This illustrated embodiment of the video services receiver 300 generally includes, without limitation: at least one processor 302; at least one data storage element 304 having a suitable amount of memory associated therewith; a receiver interface 306; a display interface 308 for the display; an audio interface 310; a recording module 312; and a remote control transceiver 314. These components and elements may be coupled together as needed for purposes of interaction and communication using, for example, an appropriate interconnect arrangement or architecture 316. It should be appreciated that the video services receiver 300 represents a "full featured" embodiment that supports various features described herein. In practice, an implementation of the video services receiver 300 need not support all of the enhanced features described here and, therefore, one or more of the elements depicted in FIG. 3 may be omitted from a practical embodiment. Moreover, a practical implementation of the video services receiver 300 will include additional elements and features that support conventional functions and operations.

The processor 302 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 302 may be realized as a microprocessor, a controller, a microcontroller, or a state machine. Moreover, the processor 302 may be implemented as a combination of computing devices, e.g., a combination of a digital signal processor and a microprocessor, a plurality of microprocessors, one or more microprocessors in conjunction with a digital signal processor core, or any other such configuration.

The data storage elements 304 may be realized using any number of devices, components, or modules, as appropriate to the embodiment. Moreover, the video services receiver 300 could include data storage elements 304 integrated therein and/or data storage elements 304 operatively coupled thereto, as appropriate to the particular embodiment. In practice, a data storage element 304 could be realized as RAM memory, flash memory, EPROM memory, EEPROM memory, registers, a hard disk, a removable disk, or any other form of storage medium known in the art. In certain embodiments, the data storage elements 304 include a hard disk, which may also be used to support integrated DVR functions of the video services receiver 300. The data storage elements 304 can be coupled to the processor 302 such that the processor 302 can read information from, and write information to, the data storage elements 304. In the alternative, the data storage elements 304 may be integral to the processor 302. As an example, the processor 302 and a data storage element 304 may reside in a suitably designed ASIC.

As depicted in FIG. 3, the data storage elements 304 can be used to store recorded programs 320 for the recording module 312, and to maintain a suitably formatted database 322 (or any appropriate data structure) that contains entries for the recorded programs. A recorded program 320 may be, without limitation: a recorded audio-only program (such as a recorded radio program or a recorded music channel); a recorded video-only or image-only program; a recorded audiovisual program that conveys both audio and video or image content; or the like. In practice, the recorded programs 320 can be formatted, handled, and stored in accordance with well known and conventional DVR techniques and methodologies.

For this particular embodiment, each recorded program 320 stored by the video services receiver 300 includes a respective entry in the database 322. Accordingly, the database 322 could contain any number of different entries (including zero), subject to practical limitations related to storage capacity, the particular database management application, etc. An entry in the database 322 will include information related to or otherwise associated with the respective recorded program 320. For example, an entry may include some or all of the following information, without limitation: an identifier of the programming service that provided the recorded program; the name of the channel; call letters and/or call numbers of the channel; the title of the program; a parental guidance rating for the program; the time duration of the program; a recording date/time stamp; a content category or classification; a brief description of the content; or the like. The data used to populate a database entry could be delivered to the video services receiver 300 during the normal scheduled broadcast of the recorded program, or it could be delivered to the video services receiver 300 prior to the scheduled broadcast. For example, the data used to populate database entries could be sent to the video services receiver 300 using one or more overhead signaling and/or control channels. The manner in which the video services receiver 300 obtains this information is unimportant for purposes of this description, and the specific data transmission methodology may vary from one deployment to another.

Notably, an identifier of the programming service could be realized in any suitable format or data structure. For example, an identifier of programming service could be the channel number of the service that provided the recorded program, or it could be any alphanumeric string that serves to distinguish the service that provided the recorded program. As another example, an identifier or programming service could be realized using a digital word having any desired bit length that can be used to uniquely identify the different programming services supported by the video services receiver. In this regard, although the identifier of programming service may be considered to be something akin to the "channel number" associated with the recorded program, it need not be contextually related to the channel number in any way.

Although the recorded programs 320 and the database 322 are depicted separately, it should be appreciated that the recorded programs 320 and the database entries could actually be stored together in a common data storage element 304. For example, the data that represents a recorded program 320 may also represent the contents of a database entry as described above. Thus, data associated with a recorded program 320 could be utilized in lieu of distinct database entries when performing the methods and processes presented below.

The receiver interface 306 is coupled to the customer's satellite antenna, and the receiver interface 306 is suitably configured to receive and perform front end processing on signals transmitted by satellite transponders. In this regard, the receiver interface 306 can receive data associated with any number of services (e.g., video services), including data that is used to populate the database 322, on-screen menus, GUIs, interactive programming interfaces, etc. The receiver interface 306 may leverage conventional design concepts that need not be described in detail here.

The display interface 308 is operatively coupled to one or more display elements (not shown) at the customer site. The display interface 308 represents the hardware, software, firmware, and processing logic that is utilized to render graphics, images, video, and other visual indicia on the customer's display. In this regard, the display interface 308 facilitates the presentation of programs on the display(s) at the customer premises. For example, the display interface 308 is capable of providing graphical interactive programming interfaces for video services, service-specific interactive listings of recorded programs, interactive graphical menus, and other GUIs for display to the user. In this regard, the display interface 308 facilitates the presentation of service-specific interactive listings of recorded programs. The display interface 308 may leverage conventional design concepts that need not be described in detail here.

The audio interface 310 is coupled to one or more audio system components (not shown) at the customer site. The audio interface 310 represents the hardware, software, firmware, and processing logic that is utilized to generate and provide audio signals associated with the operation of the video services receiver 300. Depending upon the particular embodiment, the audio interface 310 may be tangibly or wirelessly connected to the audio portion of a television or monitor device, or it may be tangibly or wirelessly connected to a sound system component that cooperates with the television or monitor device.

The recording module 312 is operatively coupled to the receiver interface 306 to record programs provided by the incoming services. In practice, the recording module 312 may include, cooperate with, or be realized as hardware, software, and/or firmware that is designed to provide traditional DVR features and functions for the video services receiver 300. Accordingly, the recording module 312 may record video programs provided by video services, audio-only programs provided by audio services, or the like. As mentioned above, the recording module 312 cooperates with the data storage elements 304 to store the recorded programs 320 as needed.

The remote control transceiver 314 performs wireless communication with one or more compatible remote devices, such as a remote control device, a portable computer, an appropriately equipped mobile telephone, or the like. The remote control transceiver 314 enables the user to remotely control various functions of the video services receiver 300, in accordance with well known techniques and technologies. In certain embodiments, the remote control transceiver 314 is also used to wirelessly receive requests that are related to the generation, display, control, and/or operation of service-specific recorded program listings. For example, the remote control device 113 (see FIG. 1) could be used to initiate the launching of a service-specific program listing. As another example, the remote control device 113 could be used to request playback of a recorded program.

Figure 4:
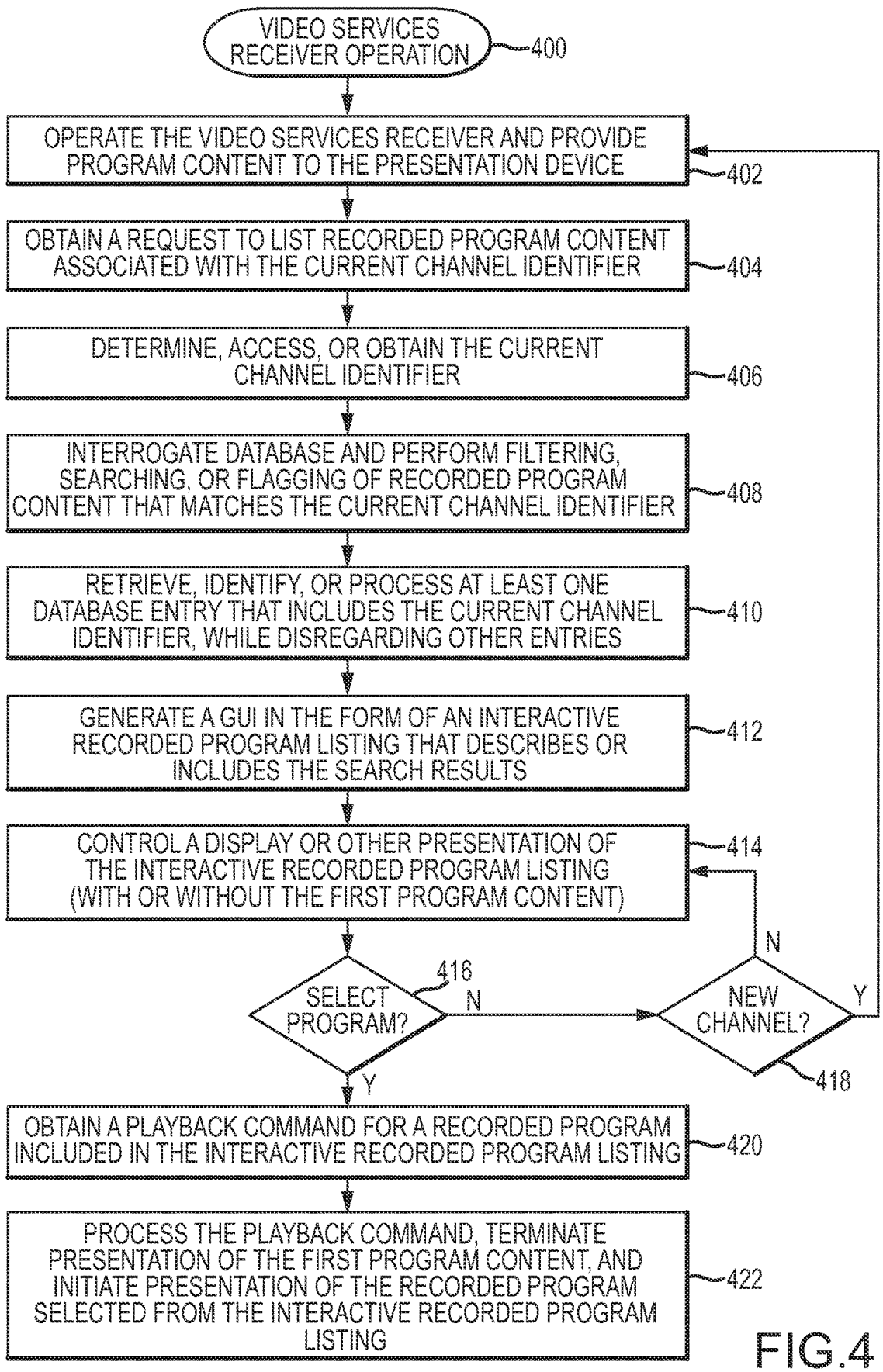
FIG. 4 is a flow chart that illustrates an exemplary embodiment of a method of operating a video services receiver.

The system 100 (FIG. 1) and the video services receiver 300 (FIG. 3) can be used to present information associated with recorded program content, e.g., an interactive service-specific or channel-specific listing of recorded programs. A service-specific or channel-specific listing can be presented as a GUI, an onscreen menu, an interactive guide, or the like. In this regard, FIG. 4 is a flow chart that illustrates an exemplary embodiment of a process 400 for operating a video services receiver. The various tasks performed in connection with the process 400 may be performed by software, hardware, firmware, or any combination thereof. For illustrative purposes, the following description of the process 400 may refer to elements mentioned above in connection with FIGS. 1 and 3. In practice, portions of the process 400 may be performed by different elements of the described system, e.g., a video services receiver, a display element, a storage element, or the like. It should be appreciated that the process 400 may include any number of additional or alternative tasks, the tasks shown in FIG. 4 need not be performed in the illustrated order, and the process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

The illustrated embodiment of the process 400 begins by operating the video services receiver to provide program content to the user's presentation device (task 402). For this example, this program content represents video programming content, although the program content could alternatively be audio-only content, still image content, video-only content, etc. Accordingly, the program content is associated with a particular programming service (a video channel for this example) in that an identifiable or designated programming service is considered to be the "provider" or "originator" or "broadcaster" of the program content. Notably, this program content represents the particular program that is currently being presented to the user at the time, whether recorded or non-recorded content. The current program content could be, without limitation: a recorded or non-recorded audiovisual program; a recorded or non-recorded audio program; a recorded or non-recorded still image or video-only program; etc. If the current program happens to be a recorded program, then a recording module and/or a data storage element of the video services receiver may be involved in the presentation of the current program. On the other hand, if the current program happens to be a non-recorded program, then task 402 may be associated with the delivery or broadcast of the current program during its scheduled time slot.

This example assumes that the user would like to view a listing of recorded programs for the channel associated with the current program. For instance, if the current program is a live basketball game being broadcast on Channel 123 using the call letters WXYZ, the user might want to view programs that have been recorded from Channel 123. In practice, the process 400 may receive or otherwise obtain a request for recorded content that is associated with the current video channel (task 404), where the current video channel has a unique identifier assigned thereto. As explained above, each programming service could be uniquely identified by its channel number, its call letters, a string of bits, an alphanumeric label, or the like. This simple example assumes that the identifier corresponds to the channel number of the video channel (i.e., the number 123).

In practice, a request for recorded content could originate at a remote control device that is linked to the video services receiver, and it could be wirelessly received at the video services receiver. In this regard, the remote control device may include a specialized button that when activated causes the process 400 to initiate the presentation of the channel-specific recorded content. In alternate embodiments, the user could enter a predefined sequence of characters or a predefined sequence of button entries to cause the process 400 to initiate the presentation of the channel-specific recorded content. Alternatively (or additionally), the process 400 could persistently or automatically present a channel-specific listing of recorded program content without any user involvement.

Whether or not the generation and presentation of the channel-specific listing is initiated by a user-originated request, the process 400 determines, accesses, or otherwise obtains the identifier of the current channel (task 406). Again, the current identifier (number 123 for this example) corresponds to the program that is currently being presented by the video services receiver. Task 406 may invoke any suitable background procedure that accesses or obtains the current channel identifier, which will be known by the video services receiver as a result of receiving, decoding, and presenting the current program. The current channel identifier can then be used to interrogate a database of recorded program content maintained by the video services receiver (task 408). Task 408 may involve database queries, searching, filtering, and/or flagging of recorded program content that matches the current channel identifier. The goal of task 408 is to find programs that were recorded from the current channel, while excluding other programs that were recorded from channels other than the current channel. Thus, task 408 filters the database contents based on the current channel identifier; if the recorded identifier for a stored program matches the current channel identifier, then task 408 will flag that stored program for inclusion in the channel-specific listing. Consequently, the channel-specific interactive listing will preferably be void of any entry having a recorded identifier that does not match the current channel identifier.

As a result of the searching or filtering procedure, the process 400 can retrieve, identify, and/or process at least one database entry that includes the current channel identifier, while disregarding other entries (task 410). These entries can be used to generate, prepare, and format an appropriate GUI in the form of an interactive recorded program listing that describes or includes the search results (task 412). In other words, the process 400 continues by presenting information that describes or includes the matching entry or entries retrieved from the database. The process 400 can then control the presentation (display) of the interactive recorded program listing (task 414). In certain situations, the channel-specific recorded program listing is presented simultaneously with the current program such that the user can continue to enjoy the current program without interruption. In other words, the process 400 controls the display of the recorded program search results without terminating the presentation of the current program content. In other scenarios, the channel-specific recorded program listing is presented in lieu of the current program.

During the process 400, a graphical listing of recorded programs can be displayed. In this regard, and referring to FIG. 5, a screen illustration of a service-specific listing 500 of recorded program content is depicted. This graphical listing 500 is merely one possible menu (with user-selectable elements) that could be generated by a video services receiver. Some of the features of the service-specific listing 500 are similar or identical to counterpart features described above for the conventional listing 200 (see FIG. 2), and common features and elements will not be redundantly described in detail here.

The service-specific listing 500 preferable includes content recorded from only one channel, and it includes, without limitation: a program description area 502; a recorded program list window 504; various command buttons 506; and a recorded channel field 508. For this example, the listing 500 only shows recorded content from one distinct and unique programming service, namely, Channel 738 (named "Fun TV"). Accordingly, all of the recorded programs available in the listing 500 will have a common channel identifier associated therewith. Moreover, the recorded channel field 508 includes text, an icon, a logo, and/or any suitable indication of the recorded channel. This example includes both the channel number (738) and the channel name (Fun TV).

The program description area 502 may be used to provide additional information or data for a selected recorded program, as described above for the conventional listing 200. The recorded program list window 504 is used to list the recorded program content corresponding to the channel shown in the recorded channel field 508. In typical implementations, the recorded program list window 504 may be similar to its counterpart described above for the conventional listing 200. The recorded program list window 504 need not include an indication of the recorded channel number, especially for embodiments where the listing 500 only includes items recorded from one and only one channel. It should be appreciated that each entry in the recorded program list window 504 might be generated and rendered as a user-selectable or focusable element of the service-specific listing 500.

For this embodiment, the command buttons 506 include the following, which were described above with reference to the conventional listing 200: Sort; Edit; Schedule; Done; Help; and History. In certain embodiments, the command buttons 506 may also include one or more of the following, without limitation: Same Category; Similar Content; and Related Channels. Each of the command buttons 206 is preferably rendered with a text label that indicates its function or feature. In practice, these functions are relevant to program recording, recorded content management, and the like.

In certain embodiments, the Same Category button can be activated by the user to search for (or otherwise include in the listing 500) recorded content that shares the same designated category or categories as the current program, the currently highlighted or focused recorded content in the recorded program list window 504, etc. For example, if the current program is categorized as a "Sports" program, then activation of the Same Category button will display other recorded programs that are flagged with the Sports category. Likewise, the Similar Content button can be activated by the user to search for (or otherwise include in the listing 500) recorded content that is contextually similar to the content of the current program, the currently highlighted or focused recorded content in the recorded program list window 504, etc. In some embodiments, the Related Channels button can be activated by the user to search for (or otherwise include in the listing 500) recorded content from other channels that might be related in some way to the current program channel. For example, if the current program channel is the west coast version of Channel MMT, activation of the Related Channels button might result in the inclusion of programs recorded from the east coast version of Channel MMT, the children's version of Channel MMT, the movie version of Channel MMT, or the like. As another example, if the current program channel is the standard resolution version of Channel KATE, activation of the Related Channels button might result in the display of any additional programs recorded from the high definition version of Channel KATE.

Figure 5:
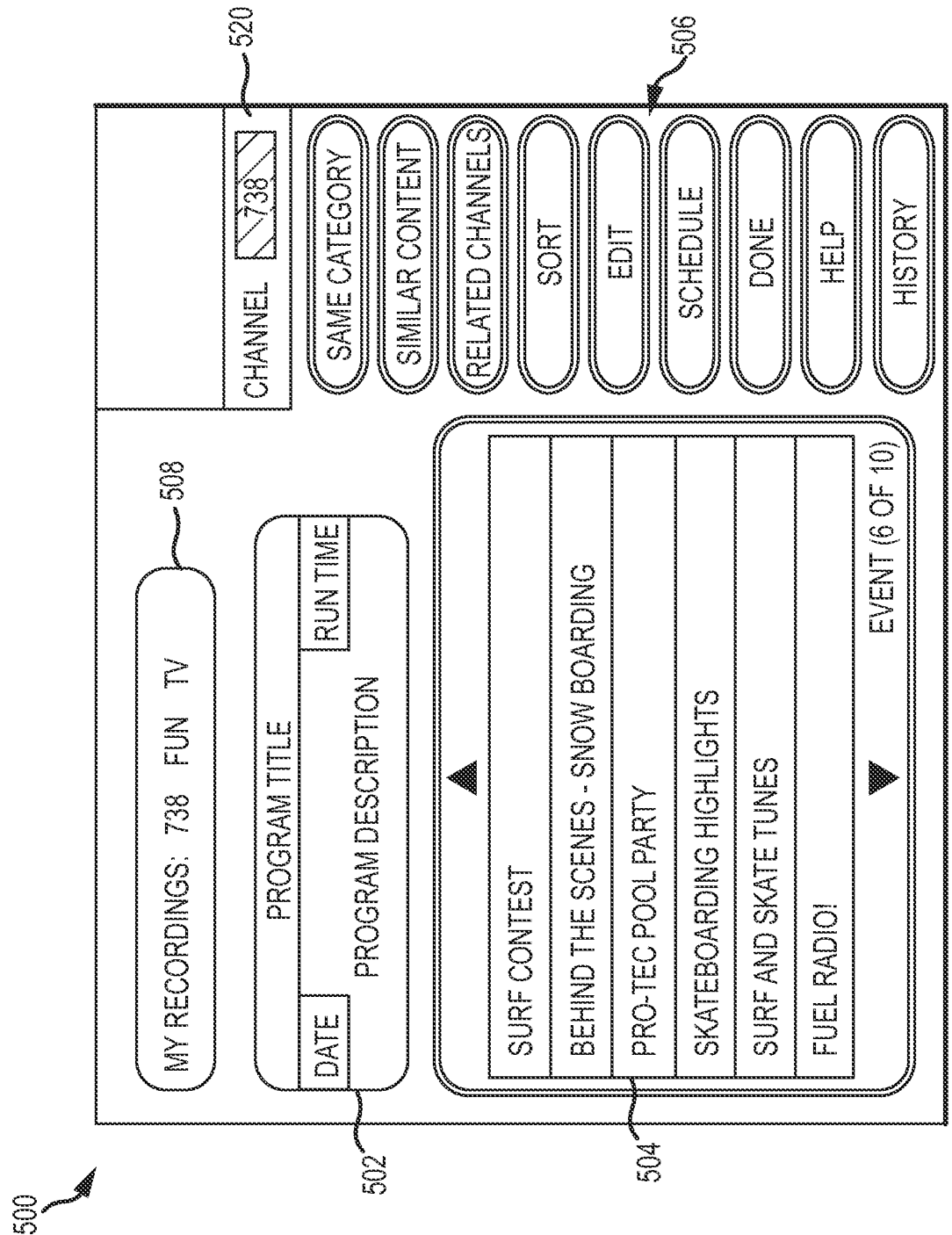
FIG. 5 is a screen illustration of a service-specific listing of recorded program content, in accordance with an exemplary embodiment of the invention.

Certain embodiments of the service-specific recorded program listing 500 may also include a channel entry field 520. The channel entry field 520 enables the user to select and enter a desired channel number to "override" the default behavior of the listing 500. FIG. 5 depicts the state where the channel entry field 520 includes the current program channel, namely, Channel 738. If, however, the user wants to view recorded content from a different channel, the channel entry field 520 can be utilized to enter a different channel number. In practice, manipulation of the channel entry field 520 could be accomplished using the remote control device that is linked to the video services receiver.

Referring back to FIG. 4, the process 400 may generate and render an interactive service-specific listing of recorded program content having selectable entries. Thus, if the process 400 does not detect the selection of a recorded program (query task 416) and does not detect a change from the current program channel to a new channel (query task 418), then it can continue to display the service-specific listing (task 414). If, however, the channel has been changed to a new channel, then the process 400 may exit or be re-entered at an appropriate point. For example, the process 400 could lead back to task 402 such that the video services receiver can initiate a new request for recorded content associated with the new channel. If query task 416 detects that the service-specific listing has been manipulated to select a recorded program, then the process 400 obtains a playback command (task 420) that is produced in response to the activation of an entry contained in the service-specific listing. The playback command can be processed in an appropriate manner to terminate presentation of the current program content, and initiate presentation of the selected recorded program (task 422). In accordance with conventional DVR control procedures, the recorded program can then be displayed in lieu of the program content that was initially presented in association with task 402.

In a typical scenario, after playback of a recorded program is initiated, the service-specific listing of recorded programs will be removed from the display. Moreover, although not depicted in FIG. 5, the service-specific listing can be removed from the display in response to user interaction with the video services receiver, the remote control device, and/or the display element. For example, presentation of the service-specific listing could be terminated in response to user activation of the "Exit" button (or a suitable equivalent) on the remote control device. As another example, if the service-specific listing is launched by a specialized remote control button, then presentation of the service-specific listing could be terminated in response to a subsequent user activation of the same specialized button.

Figure 6:
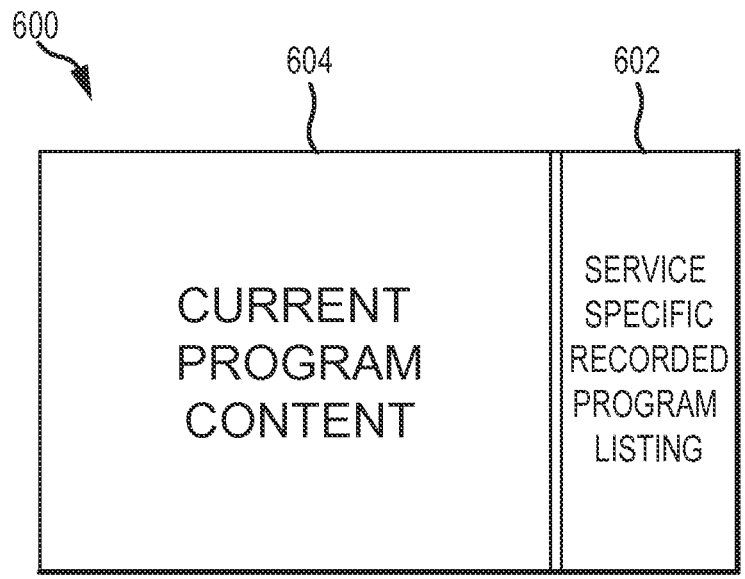
FIGS. 6-9 are diagrams that show several exemplary screen layouts for a service-specific listing of recorded program content.
Figure 7:
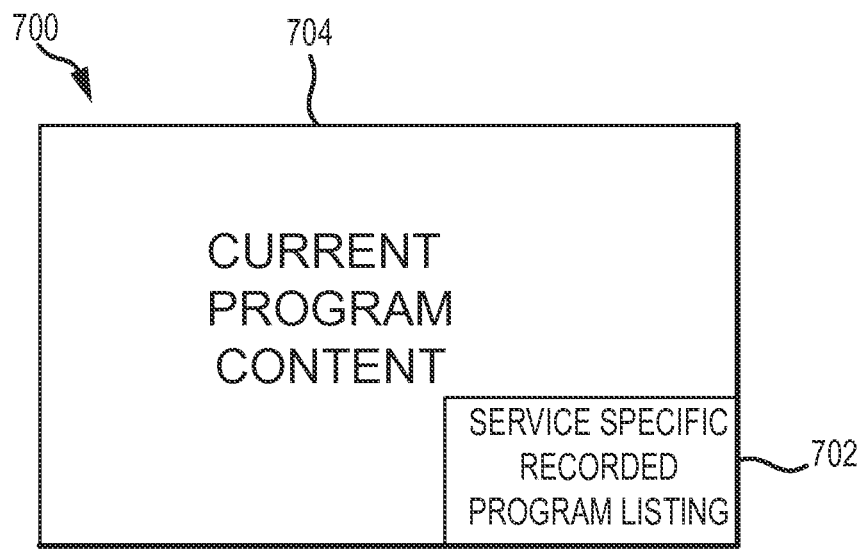
Figure 8:
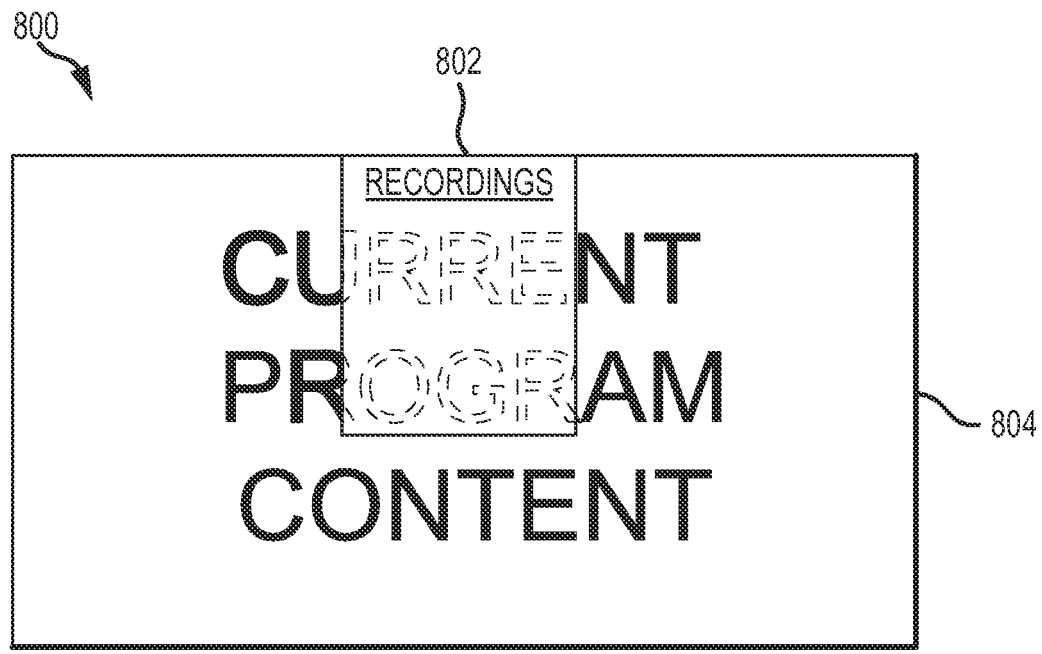
Figure 9:
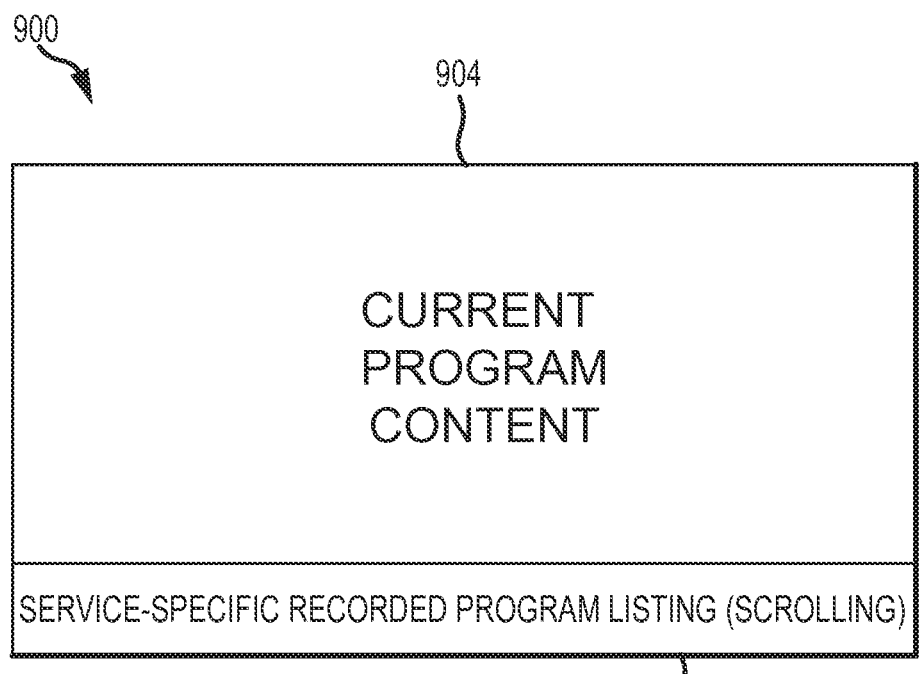

It should be appreciated that FIG. 5 depicts only one possible layout that is suitable for a service-specific listing of recorded program content. Moreover, for ease of description and illustration, FIG. 5 shows a full-screen version of a service-specific listing. In practice, however, a service-specific listing need not be arranged in a full-screen mode. In this regard, FIGS. 6-9 are diagrams that show several exemplary screen layouts for a service-specific listing of recorded program content. FIG. 6 depicts a split-screen implementation of a display 600 that includes a service-specific recorded program listing 602 in one portion of the display 600, and the current program content 604 displayed in another portion of the display 600, with no overlap between the two portions. FIG. 7 depicts a picture-in-picture implementation of a display 700 that includes a service-specific recorded program listing 702 in a picture-in-picture window of the display 700, and the current program content 704 displayed in the primary window of the display 700, with no overlap between the two windows. FIG. 8 depicts a "translucent" overlapping implementation of a display 800 that includes a see-through service-specific recorded program listing 802 that is superimposed over the current program content 804. The service-specific recorded program listing 802 is rendered using transparency or translucency effects such that at least some of the underlying current program content 804 remains visible through the service-specific program listing 802. FIG. 9 depicts a scrolling or ticker tape implementation of a display 900 that includes a service-specific recorded program listing 902 positioned in an unobtrusive location of the display 900. The remainder of the display 900 is devoted to the current program content 904. This particular implementation could be utilized to display the service-specific program listing 902 in a persistent manner that is automatically updated whenever the current channel is changed. In practice, the content of the service-specific recorded program listing 902 can be scrolled across the display 900 as needed such that the user can casually view the recorded programs when needed, without diverting attention away from the current program content 904.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of presenting information associated with program content recorded with a video services receiver, the method comprising:
   providing, by the video services receiver, program content associated with a program channel that is selected by the user for presentation by a presentation device;
   in response to a subsequent user input received in response to a button press by the user, the video services receiver automatically:
      determining an identifier of the program channel corresponding to the program content that is currently being provided by the video services receiver;
      interrogating a database of recorded program content maintained by the video services receiver to identify recorded program content having the identifier;
      retrieving, from the database, at least one entry that includes the identifier, while disregarding any entry in the database that does not include the identifier to thereby create a listing of recorded program content that has been recorded from the program channel by the video services receiver, wherein the listing of recorded program does not include any recorded program content that has not been recorded from the current program channel; and
      providing the listing of the recorded program content that has been recorded from the program channel for presentation by the presentation device, wherein the listing is presented as an interactive program listing that accepts inputs from the user; and
   in response to the video services receiver receiving a second user input selection made with reference to the interactive listing that indicates a recorded program content in the listing, the video services receiver automatically:
      initiating playback of the indicated recorded program content on the presentation device; and
      ending presentation of the interactive listing from the presentation device.

2. The method of claim 1, wherein:
   the at least one entry comprises an audiovisual program; and
   the method further comprises presenting the audiovisual program simultaneously with displaying the interactive listing.

3. The method of claim 1, wherein:
   the at least one entry comprises an audio program; and
   the method further comprises presenting the audio program simultaneously with displaying the interactive listing.

4. The method of claim 1, further comprising receiving, at the video services receiver, a request for recorded content associated with the current program channel, wherein interrogating the database is initiated by the request.

5. The method of claim 4, wherein receiving the request comprises wirelessly receiving the request from a remote control device that is linked to the video services receiver.

6. A video services receiver for providing television programs to a user, the video services receiver comprising:
   a receiver interface to receive the television programs via a plurality of different broadcast television channels, wherein each of the broadcast television channels is associated with a channel identifier;
   a video recorder coupled to the receiver interface to record television programs received via the plurality of different channels, and to maintain a database that contains an entry for each recorded television program that comprises the channel identifier for the broadcast television channel transmitting the television program;
   a display interface for a display operatively coupled to the video services receiver, the display interface facilitating presentation of programs on the display, and facilitating presentation of service-specific interactive listings of recorded programs; and
   a processor coupled to the receiver interface, the recording module, the at least one data storage element, and the display interface, wherein the processor is operable to:
   during presentation of a television program received via a broadcast television channel on the display, receive a button press by the user;
   in response to the button press by the user, the video receiver device automatically creating a listing of the television programs recorded on the video recorder of the video receiver device having the same channel identifier as the broadcast television channel of the currently-presented television program and providing the automatically-created listing to the display for presentation as an interactive listing of programs recorded from the same broadcast television channel;
   in response to a subsequent user input made with reference to the interactive listing of programs that indicates one of the television programs recorded on the video recorder, the video receiver device initiating playback of the indicated television program on the display.

7. The video services receiver of claim 6, wherein the display interface provides the service-specific interactive listing for rendering on the display.

8. The video services receiver of claim 7, wherein the display interface provides the service-specific interactive listing for rendering on the display with the presented program.

9. The video services receiver of claim 6, wherein the processor terminates presentation of the presented program in response to a playback command for playback of a recorded program identified by the interactive listing.

10. An automated process performed by a video receiver device that provides television programs for presentation on a presentation device, the automated process comprising:
    receiving, by the video receiver device, the television programs on a plurality of different broadcast television channels, wherein each of the broadcast television channels is associated with a channel identifier;
    recording at least some of the received television programs to a video recorder of the video receiver device;
    during presentation of a television program received on a program channel by the presentation device, receiving a button press by the user;
    in response to the button press, the video receiver device automatically creating a listing of the television programs recorded on the video recorder of the video receiver device having the same channel identifier as the program channel of the currently-presented television program and providing the automatically-created listing to the presentation device for presentation as an interactive listing of programs recorded from the same broadcast television channel;
    in response to a subsequent user input made with reference to the interactive listing of programs that indicates one of the television programs recorded on the video recorder, the video receiver device initiating playback of the indicated television program by the presentation device.

* * * * *